(12) United States Patent
Duzett et al.

(10) Patent No.: US 9,331,867 B2
(45) Date of Patent: May 3, 2016

(54) VIRTUAL NETWORKS IN A COMMUNICATION SYSTEM ARCHITECTURE

(75) Inventors: Robert C. Duzett, Hillsboro, OR (US); Steven R. Page, Hillsboro, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 477 days.

(21) Appl. No.: 12/001,930

(22) Filed: Dec. 12, 2007

(65) Prior Publication Data

US 2009/0067444 A1 Mar. 12, 2009

Related U.S. Application Data

(63) Continuation of application No. PCT/US2006/022881, filed on Jun. 12, 2006.

(51) Int. Cl.
*G06F 3/00* (2006.01)
*H04L 12/46* (2006.01)
*G06F 3/06* (2006.01)

(52) U.S. Cl.
CPC .......... *H04L 12/4641* (2013.01); *G06F 3/0613* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,701,502 A | * | 12/1997 | Baker et al. | 709/201 |
| 5,832,310 A | * | 11/1998 | Morrissey et al. | 710/71 |
| 6,044,225 A | * | 3/2000 | Spencer et al. | 710/52 |
| 6,219,699 B1 | * | 4/2001 | McCloghrie et al. | 709/221 |
| 6,222,846 B1 | * | 4/2001 | Bonola et al. | 370/402 |
| 6,421,754 B1 | * | 7/2002 | Kau et al. | 710/261 |
| 6,625,753 B1 | * | 9/2003 | Skogman et al. | 714/13 |
| 7,051,123 B1 | * | 5/2006 | Baker et al. | 710/22 |
| 8,307,194 B1 | * | 11/2012 | Scott et al. | 712/34 |
| 2001/0016879 A1 | * | 8/2001 | Sekiguchi et al. | 709/319 |
| 2004/0202329 A1 | * | 10/2004 | Jung et al. | 380/273 |

\* cited by examiner

*Primary Examiner* — Henry Tsai
*Assistant Examiner* — Aurangzeb Hassan
(74) *Attorney, Agent, or Firm* — Bart A. Perkins

(57) ABSTRACT

One or more I/O channels are assigned masks of message types that may pass through the channels, and one or more fields of an outbound message are set to one or more message type. A channel mask of an I/O channel is applied to a type of the outbound message, and if the channel mask matches the type of the outbound message, the outbound message is allowed to pass through the I/O channel to a switch. The outbound message is switched to an output port, and if the channel mask does not match the type of the outbound message, the outbound message is rejected from passing through the I/O channel and the channel mask of a next I/O channel is applied to the type of the outbound message.

14 Claims, 3 Drawing Sheets

VIRTUAL NETWORKS IN A COMMUNICATION SYSTEM ARCHITECTURE

PRIORITY CLAIM AND CROSS REFERENCE TO RELATED APPLICATIONS

This application claims priority under 35 U.S.C. 120 and/or 35 U.S.C. 365 as a continuation of the PCT application titled VIRTUAL NETWORKS IN A COMMUNICATION SYSTEM ARCHITECTURE, having application number PCT/US2006/022881, filed on Monday, Jun. 12, 2006, now abandoned.

TECHNICAL FIELD

The present disclosure relates to networking and data routing.

BACKGROUND ART

Data communication in high-performance systems may lead to decreased performance when certain types of messages come to dominate bandwidth utilization. Important messages may be unacceptably delayed under these circumstances.

DISCLOSURE OF INVENTION

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve assigning to one or more I/O channels masks of message types that may pass through the channels, and when a message is sent or received, assigning to the message a channel having a mask that matches a type of the message. Assigning to one or more I/O channels masks of message types that may pass through the channels may include and/or involve assigning mask values corresponding to message priority levels, and/or each mask of message types defining up to sixteen types of messages, and/or the number of channels allocated to process sent messages twice the number of channels allocated to process received messages, and/or associating a mask register with each I/O channel, and writing a message type mask value to the mask register of each I/O channel. Sixteen channels may be allocated to process sent messages and eight channels allocated to process received messages.

The method may include and/or involve providing received messages to receive commands having the same type as the received messages.

The method may include and/or involve assigning a message that is sent to a port, and assigning a send channel to the port.

The method may include and/or involve receiving a message at a port, and assigning a receive channel to the port, the receive channel having a mask including a same message type as the message.

A method may include and/or involve assigning at least one type for outbound data, searching among available send channels for a channel having a type that matches the data type, and if a matching channel is found, allocating the channel to pass the outbound message to an I/O port. Assigning at least one type for outbound data may include and/or involve assigning at least one priority for the outbound data.

A method may include and/or involve assigning at least one type for inbound data, when inbound data is received at an I/O port, searching among available receive channels for a channel having a type that matches a type of the inbound data, and providing the inbound data to a receive command having a type matching the type of the inbound data. Assigning at least one type for inbound data may include and/or involve assigning at least one priority for the inbound data.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Typed I-O System

Figure 1:
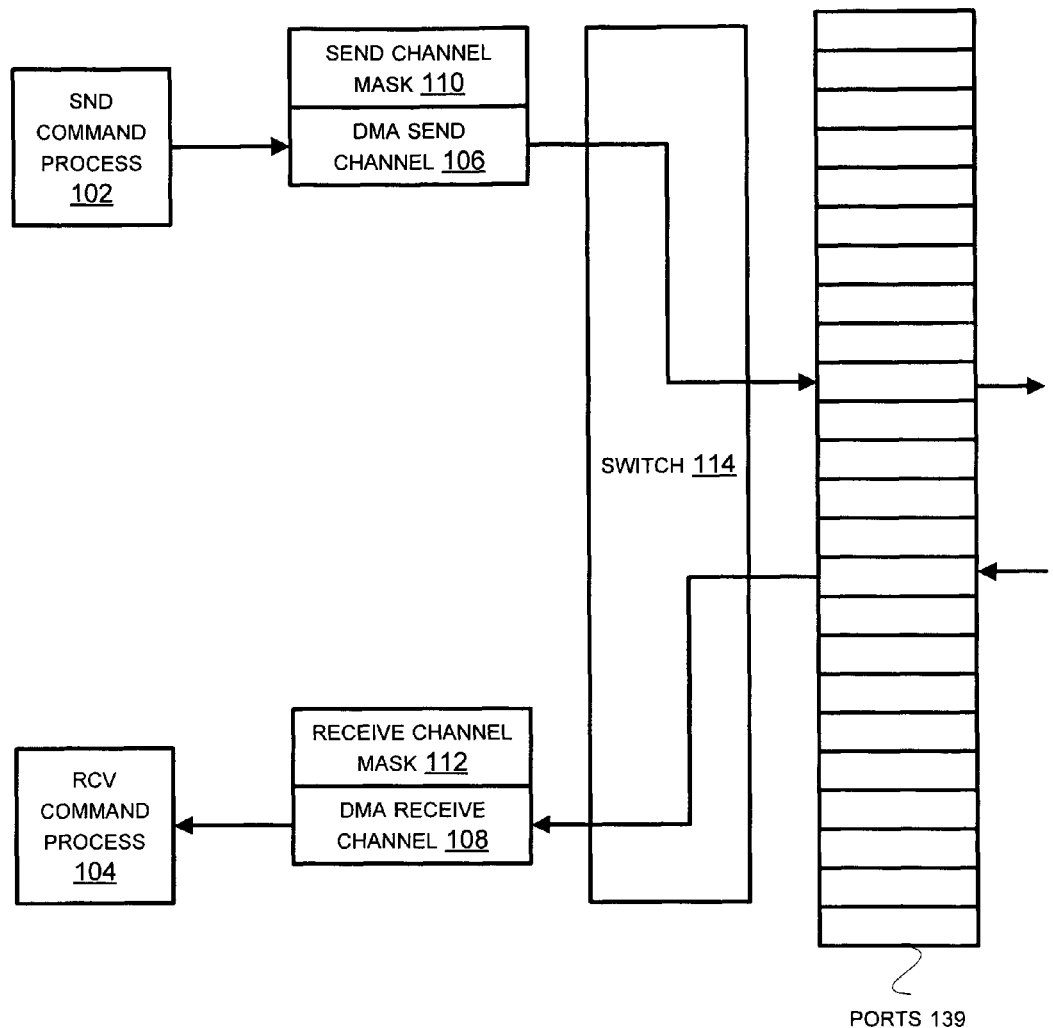
FIG. 1 is a block diagram of an embodiment of a typed I-O system.

FIG. 1 is a block diagram of an embodiment of a typed I/O system. The system comprises a processor or processors, logic, and memory. Logic comprises a send command process 102 and a receive command process 104.

The send command process 102 may effect the placement of an outgoing message into a direct memory access send channel 106. Messages so placed have an associated message type which may be considered to be a field or fields, a byte or bytes or bits, for example comprising a send channel mask 110, e.g. message type identification.

The receive command process 104 may process an incoming message present in a direct memory access receive channel 108. Messages so received have an associated message type which may be considered to be a field or fields, a byte or bytes or bits, for example comprising a receive channel mask 112 e.g. a message type identification.

The system further comprises a switch 114 which may have access to the send message channels 106 and which may effect the sending of outgoing messages to the ports 139. The switch 114 may have access to the receive message channels 108 and may effect the receiving of incoming messages from the ports 139.

Typed I/O Commands and Channels

One or more I/O channels are assigned masks of message types that may pass through the channels, and when a message is sent or received the message is assigned to a channel having a mask that matches a type of the message. For example, a message type may be contained in a half-byte of 4 binary bits. A mask may consist of 4 bits, numbered 0 through 3, where 3 is the high order bit. An outgoing I/O channel may be used for messages with bits 2 and/or 3 set in the mask.

Other embodiments may not use a mask but may instead simply assign one or more numeric types to the channel. For example, message types may consist of values 1, 3, 4, 6, 8, 11, and 17, and so on. One channel may be assigned to types 1, 3, and 4. A second channel may be assigned to types 1, 6, and 11 and so on. Notice that in this example, outgoing message type 1 was assigned to more than one channel. In this example, the message types are numeric, but potentially they could be otherwise defined. For example, the message types could consist of a letter or word or combination of letters and numbers.

A sent message may be assigned one or more types and may be provided only to available I/O channels having a mask that matches the message type. One the receiving end, received messages may be provided only to available receive channels having masks that match the message type. From the receive channels, the received messages may be provided to commands i.e. logic which will process the received messages. The received messages may be provided only to receive commands having the same type as the received messages.

Assigned mask values may correspond to message priority levels. For example, the higher the bits set in the mask the higher the priority of the messages. For example, each mask of message types may define up to sixteen types of messages with a corresponding sixteen message priorities. In some embodiments, several message types may be identified using the mask as having the same message priority. Thus a message with highest masking bit set bit 1 may have a priority of 1; a message with highest masking bit set bit 2 may have a priority of 2, and so on. Masks may enable the efficient categorization of messages corresponding to message types quickly and with great flexibility. The use of masks to identify message priorities may encompasses many variations.

In some embodiments, the number of channels allocated to process sent messages may be twice the number of channels allocated to process received messages. For example, sixteen send channels may be allocated to process sent messages, and eight receive channels may be allocated to process received messages.

In practice, a mask register may be associated with each I/O channel, and a message type mask value may be written to the mask register of each I/O channel.

A message that is sent may be assigned to a port, and a send channel may be assigned to the port. A communication path is thus established from the send command, through a send channel, to an output port, to the physical transmission facility.

A message may be received at a port, and a receive channel assigned to the port. The receive channel has an associated mask that includes a same message type as the message. The message may then be provided from the receive channel to a receive command having a same type as the message. A communication path is thus established from the physical transmission facility through the receive channel to the receive command.

Process for Managing Outbound Typed Messages

Figure 2:
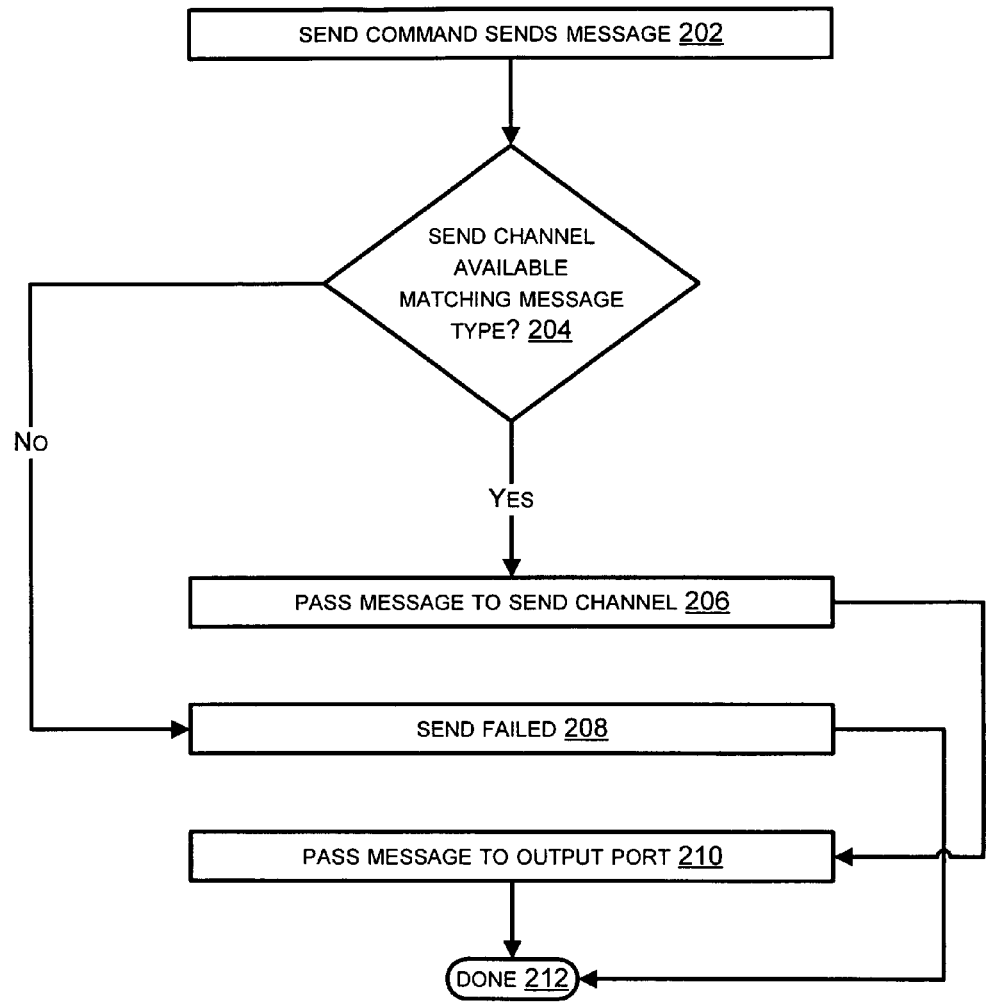
FIG. 2 is a flow chart of an embodiment of a process for managing outbound typed messages.

FIG. 2 is a flow chart of an embodiment of a process for managing outbound typed messages. Message type masking is performed to associate a message with an appropriate send channel. At 202, the send command sends an outgoing message. The outgoing message type is examined using a message mask. If there is no available send channel which corresponds to the message masking result, the send is failed at 208 and processing is done at 212.

If there is an available send channel corresponding to the message masking result, at 206 the message is passed to the send channel. At 210, the switch effects the passing of the message to an output port. At 212, processing is complete.

At least one type is assigned for outbound data. A search is made among available send channels for a channel having a type that matches the data type. The 'search' may simply involve identifying a next available send channel having a mask matching the message type. If a matching channel is found, the channel is allocated (assigned) to pass the outbound message to an I/O port. The message type may indicate at least one priority for the outbound data.

Process for Managing Inbound Typed Messages

Figure 3:
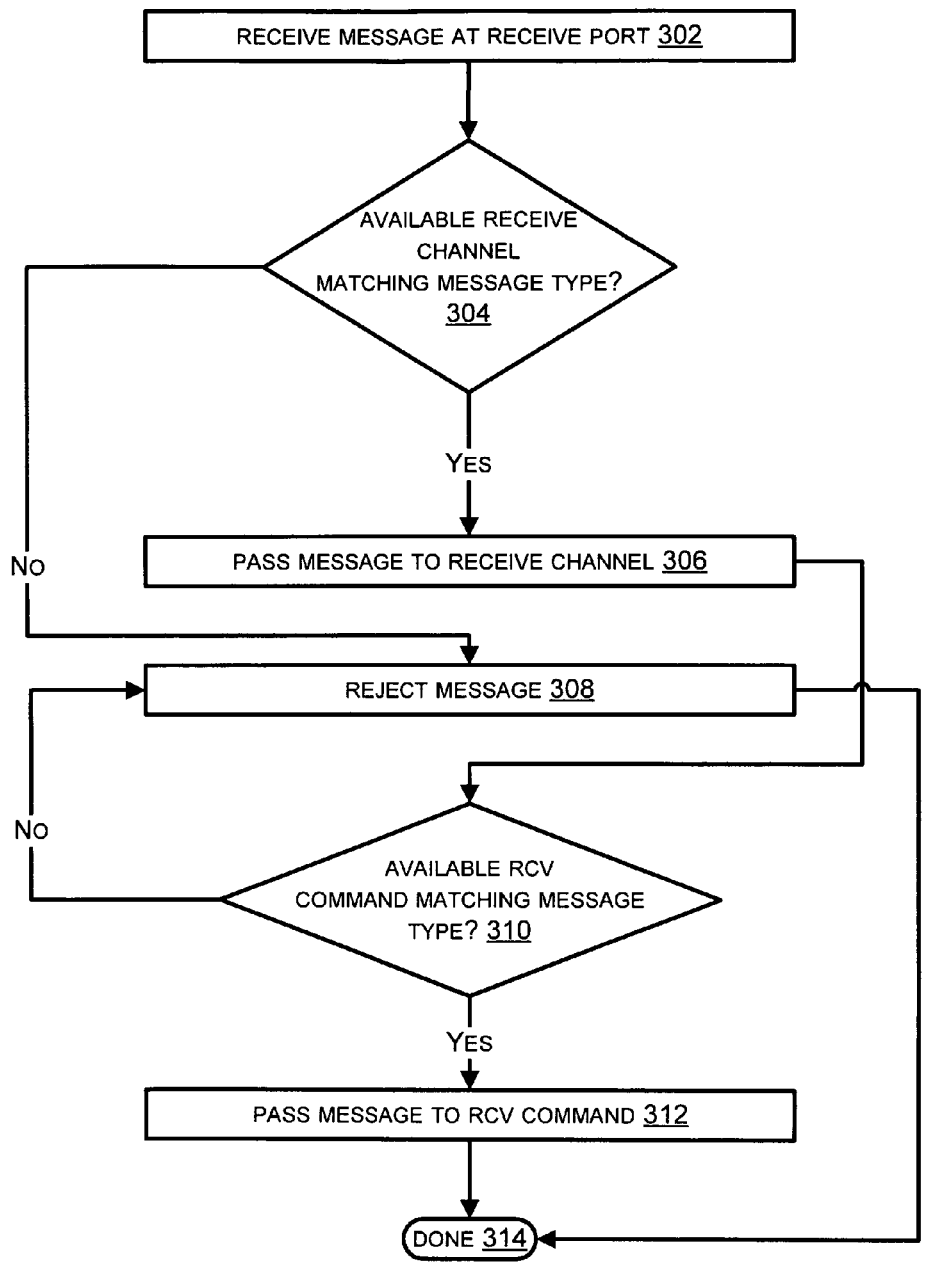
FIG. 3 is a flow chart of an embodiment of a process for managing inbound typed messages.

FIG. 3 is a flow chart of an embodiment of a process for managing inbound typed messages. At 302, a receive message is at a receive port. At 304, the message type of the receive message is examined to determine if there is an available receive channel. If there is no available receive channel, at 308, the receive message is rejected. At 314, processing is complete.

At 306, there was an available receive channel, so the switch passes the message to the receive channel. At 310, the message type is examined to determine its associated receive command and command availability. If there is no associated available receive command, at 308 the received message is rejected.

At 312, the message is passed to the associated receive command for processing. At 314, processing is complete.

At least one type is assigned for inbound data. When inbound data is received at an I/O port, a search is made among available receive channels for a channel having a type that matches a type of the inbound data. The 'search' may simply involve identifying a next available receive channel having a mask matching the message type. The inbound data may be provided to a receive command having a type matching the type of the inbound data. The message type may indicate at least one priority for the inbound data.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
   assigning a channel mask to an input/output channel, the channel mask corresponding to one or more message types that may pass through the input/output channel;
   setting, in an outbound message, one or more field of the outbound message to identify the one or more message types that may pass through the input/output channel;
   applying the channel mask of the input/output channel to the field of the outbound message;
   associating a channel type mask register with each of a plurality of input/output channels;
   writing one of a plurality of channel masks to the channel type mask register of each of the plurality of input/output channels;
   if a type of the field of the outbound message is comprised by the channel mask, permitting the outbound message to pass through the input/output channel to a switch, and switching the outbound message to an output port; and
   if the type of the field of the outbound message is not comprised by the channel mask, rejecting the outbound message from passing through the input/output channel, and applying a next input/output channel mask of a next available input/output channel to the field of the outbound message.

2. The method of claim 1, further comprising:
   the channel mask corresponding to one or more message priority level.

3. The method of claim 1, further comprising:
   the channel mask defining up to sixteen types of messages.

4. The method of claim 1, further comprising:
   allocating a number M of output channels to process a plurality of outbound messages and a number N of input channels to process a plurality of inbound messages, where M?2N.

5. The method of claim 4, further comprising:
   the number M of output channels being 16 and the number N of input channels being 8.

6. The method of claim 1, further comprising:
   communicating the outbound message from a typed input/output command to the input/output channel.

7. A method comprising:
   receiving an inbound message at an input port;

applying a channel mask already associated with an input/output channel to one or more field of the inbound message, the field of the inbound message comprising one or more message type;

associating a channel type mask register with each of a plurality of input/output channels;

writing one of a plurality of channel masks to the channel type mask register of each of the plurality of input/output channels;

if the channel mask comprises a type of the field of the inbound message, activating a switch to route the inbound message to the input/output channel; and if the channel mask does not comprise the type of the field of the inbound message, applying the channel mask of a next available input channel to the field of the inbound message.

8. The method of claim 7, further comprising:
communicating the inbound message from the input/output channel to receive command logic having a command type matching the message type.

9. The method of claim 7, further comprising:
the channel mask comprising values corresponding to message priority levels.

10. The method of claim 7, further comprising:
the channel mask defining up to sixteen types of messages.

11. The method of claim 7, further comprising:
allocating a number M of output channels to process a plurality of outbound messages and a number N of input channels to process a plurality of inbound messages, where M?2N.

12. The method of claim 11, further comprising:
the number M of output channels being 16 and the number N of input channels being 8.

13. A communication system, comprising:
a switch;
a plurality of input/output ports;
receive command logic having at least one command type;
a plurality of input/output channels, each of the plurality of input/output channels being assigned at least one channel type; and
logic to:
  compare the channel type of an input/output channel of the plurality of input/output channels to a field of an inbound message, the field of the inbound message comprising a message type;
  associate a channel type mask register with each of the plurality of input/output channels;
  write one of a plurality of channel masks to the channel type mask register of each of the plurality of input/output channels;
  if the channel type of the input/output channel comprises the message type, activate the switch to route the inbound message to the input/output channel; and
  to route the inbound message to the receive command logic having the command type and comprising the message type.

14. A communication system, comprising:
a switch;
a plurality of input/output ports;
send command logic having a command type;
a plurality of input/output channels, each of the plurality of input/output channels having at least one channel type; and
logic to:
  associate a channel type mask register with each of the plurality of input/output channels;
  write one of a plurality of channel masks to the channel type mask register of each of the plurality of input/output channels;
  accept an outbound message to the send command logic, the send command logic accepting the outbound message only if the outbound message has a message type comprising the command type of the send command logic;
  compare the channel type of an output channel of the plurality of input/output channels to at least one field of the outbound message to determine if the field of the outbound message comprises the message type; and
  if the channel type of the output channel comprises the message type, communicating the outbound message from the send command logic through the output channel to the switch, and from the switch to one of the plurality of input/output ports.

* * * * *